Figure 1:
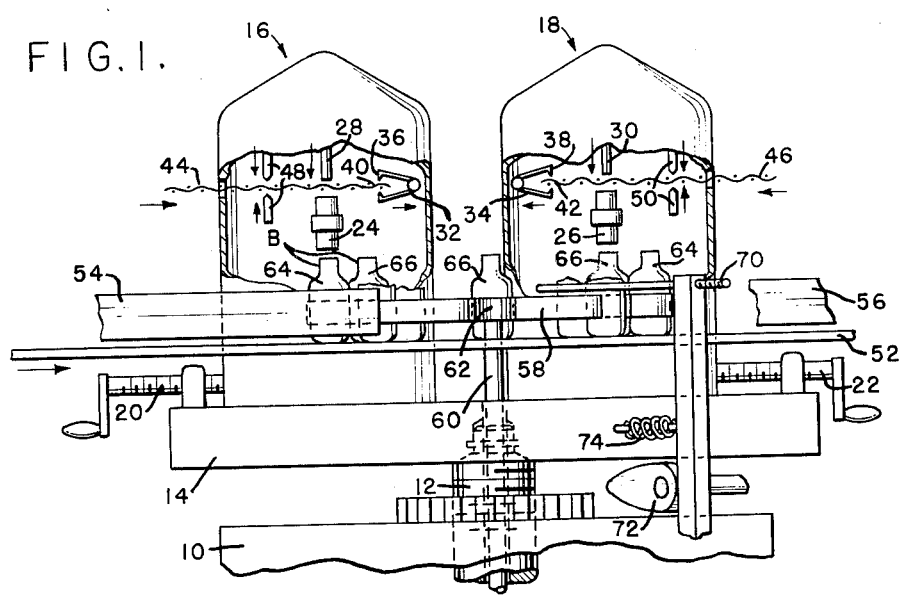

Dec. 21, 1965  E. E. LAKSO  3,224,157
WADDING CONTAINERS
Filed Nov. 15, 1962

INVENTOR.
EINO E. LAKSO
BY Charles R. Fay, atty.

United States Patent Office 3,224,157
Patented Dec. 21, 1965

3,224,157
WADDING CONTAINERS
Eino E. Lakso, Fitchburg, Mass., assignor to The Lakso Company Incorporated, Fitchburg, Mass., a corporation of Massachusetts
Filed Nov. 15, 1962, Ser. No. 237,912
6 Claims. (Cl. 53—21)

This invention relates to a new and improved method and apparatus for wadding containers such as bottles which have been filled with discrete articles such as tablets, capsules or the like and in which it is desired to position a kind of resilient wad to prevent relative motion of the articles in the containers during shipment, etc. There are many examples in the prior art of the machines for wadding containers and the following are examples of patented structures illustrating this general operation: 2,269,722 dated January 13, 1942; 2,895,269 dated July 21, 1959, and 3,030,748 dated April 24, 1962. The present invention utilizes some of the mechanisms shown in these patents, particularly the last one.

It is the general object of the present invention to speed up the wadding operation so as to obviate the delays heretofore necessary in the wadding operations as compared to the speed of the general line of advancing containers which have been filled with the discrete articles and are to be labeled, capped and boxed, and in general this purpose is achieved by providing a rotating indexing disc or the like in a rectilinearly moving line of filled containers, said disc having provision for removing said containers a plurality at a time such as for instance illustrated below in pairs and then wadding one only of each pair at one position of index or station of the disc and wadding the other of each pair of filled containers at a different station, utilizing two or more wadding devices such as shown in the prior art for this purpose, said wadding devices however having sufficient space to operate by reason of being separated for instance diametrically across the disc, and including means for extracting the pairs of plural members of now-wadded containers from the disc and repositioning the same in the general line of advance of the containers for the subsequent capping, labeling and boxing operations.

A further object of the invention resides in the provision of mounting said wadding devices on a vertically adjustable base so that bottles of different heights or different lengths of necks are easily serviced; and the provision of means for adjusting said wadding devices generally radially with respect to said disc so as to accommodate different kinds of bottles or other containers, and also for readjusting the same into the same circle or radius to provide for a double wadding operation particularly for large bottles which require more wadding, without however making any other adjustments on the machine.

The invention further relates to arrangements and combinations of parts which will be hereinafter described and more particularly set forth in the appended claims.

Figure 2:
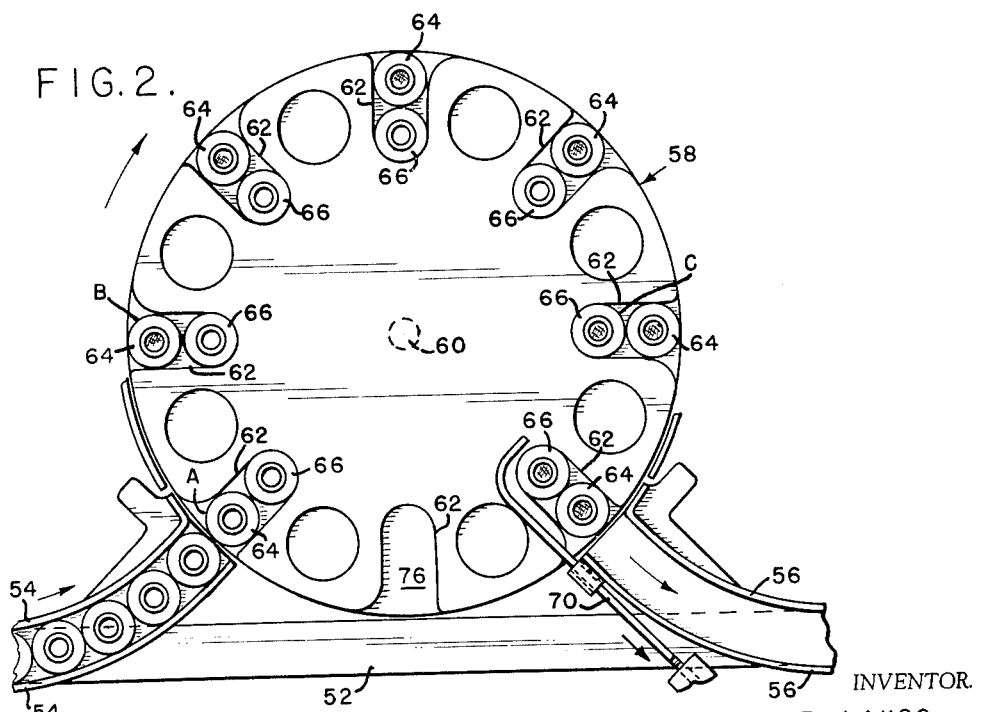

Reference is to be had to the accompanying drawings, in which:

FIG. 1 is a diagrammatic representation illustrating so much of the apparatus in elevation as is necessary to carry out the present invention, and FIG. 2 is an enlarged plan view illustrating the disc and the method of operation for wadding the containers in pairs.

Referring now to FIG. 1 there is shown a floor, machine frame, base or the like 10 upon which there is vertically adjustably mounted as by a screw 12 another base 14. The base 14 mounts upon it a pair of wadding devices which are indicated by the reference numerals 16 and 18 and each of these wadding devices are arranged to be rectilinearly adjusted to and from each other by means of individual screw shafts 20 and 22 properly mounted on base 14 for this purpose.

Each of the wadding devices is made generally according to the prior art and particularly according to prior Patent No. 3,030,748 to which reference is made to show operating details thereof. However, each wadding device is provided with a hollow tube 24, 26 arranged in vertical relationship and having a vertical plunger or the like 28, 30 arranged to reciprocate from above the upper end of each tube, down through the tube. Each wadding device also is provided with a reciprocating member 32, 34 which has teeth or the like at 36, 38 for the purpose for grasping the forward or leading end 40, 42 of for instance cotton wadding 44, 46 which may be supplied from any source as for instance from a barrel-like container as is well known in the art. Each wadding device is provided with a cutoff 48, 50 which severs the wadding at the desired location and allows the plungers 28, 30 to descend through the respective tubes 24 and 26 to fold the wadding in the tube by doubling it and then to push the thus folded wadding downwardly and out of the lower end of the respective tube into the necks of containers advancing step-by-step to the required positions under the tubes. No mechanisms are shown for operating the various parts of the wadding devices, these being shown in the prior art as for instance exemplified above, as in the use of various cams and shafts, and thus forming no particular part of the present invention except insofar as they are necessary for the actual operation of the machine.

An endless conveyor 52 is provided and in FIGS. 1 and 2 this conveyor is traveling continuously to the right. It carries between guides 54 a continuous supply of filled bottles also to the right. The guides 54 are curved inwardly slightly (see FIG. 2) and a similar curvature at 56 is provided for the wadding containers as they are extracted from the wadding apparatus back onto the conveyor 52.

A disc generally indicated by the reference numeral 58 is intermittently roated on an axle 60 by any desired or convenient means which however operates in timed relation with respect to the wadding devices above described, so that the disc 58 is adapted to stop momentarily at each descent of the plungers 28 and 30. The disc 58 is provided with a series of like radial slots which are indicated at 62. Each slot is of a length and width to accommodate exactly two of the bottles, these being indicated at the initial slot 62 by the reference numerals 64 and 66. The bottles have been filled with discrete articles or the like and these two bottles are now to be wadded. The disc is rotated in a clockwise direction as seen in FIG. 2. It will be noted that each bottle 64 is radially outwardly positioned with respect to each bottle 66 and that therefore two circular lines of bottles are represented in FIG. 2. There could of course be three or more lines of these bottles but a pair of bottles is thought to be representative to show the principle of the invention.

It will also be noted that there happen to be eight slots in the disc shown in FIG. 2 but any number of slots desired or convenient can be utilized. In any event in the present case there being eight slots there are in effect eight stations. At the first index stop at Station A the two bottles are received in the slot. At the next stop at Station B, bottle 64 is operated upon by the wadding device 24. When bottles reach Station C, bottle 66 is operated upon and wadded by means of tube 26 and then both bottles 66 and 64 have been wadded and are ready to be extracted. A rectilinearly radially movable hook-shaped member 70 which operates in timed relation to the other parts of the device as for instance by a cam 72 and a pullback spring 74 moves the pairs of containers to the guides 56 and back onto the conveyors 52.

By this means it will be seen that the disc causes double the amount of containers to be wadded than would otherwise be possible and the line can operate at twice the usual wadding speed by the use of the pairs of containers being wadded separately, i.e., at Station B and Station C.

Although not illustrated, the wadding devices 16 and 18 mounted on base 14 are provided on overhanging supports so that the supporting mechanism for the wadding details overhangs the disc in such a way as to completely avoid the same while still being fully operative.

Different discs with different sizes of slots are used for different sizes of bottles and in some cases it may be necessary to adjust the exact positions of the plungers of the wadding devices and this is done by means of the screws 20 and 22. Also it is important to position the lower end of each tube 24, 26 as close as possible to the necks of the bottles without interfering with the same, and this is accomplished by rotating screw 12 so as to move the base 14 up and down. This can be done by any kind of power means or by a hand wheel on screw 12.

The two wadding devices can also be moved to equal distances from the center of the axle 60 in order to provide extra large bottles with a double amount of wadding and this can be done without adjusting the stroke of the cotton pulling devices 32, 34 and the positions of the cutters 48 and 50 although these can be also adjusted. It is also clear that the slots can be blocked off as desired if it is desired to wad one bottle per slot. One of the wadding devices will be made inoperative or if an extra amount of wadding is to be utilized, then the plungers and tubes will be positioned at equal distances from the center of the disc. Also a suitable plate is provided under the disc upon which the bottles slide but are supported in position, this plate lying just behind the conveyor 52 in FIG. 1 and is shown at 76 in FIG. 2.

Having thus described my invention and the advantages thereof, I do not wish to be limited to the details herein disclosed, otherwise than as set forth in the claims, but what I claim is:

1. The method of wadding containers which comprises feeding a single line of containers to be wadded along a predetermined line, separating the containers a pair at a time from the line and arranging the pairs in generally radial condition with respect to a center, moving the pairs about the center, wadding one only of each pair of containers at an initial station at a predetermined distance from the center, wadding the other of each of said pair of containers at a succeeding station at a different predetermined distance from the center, and transferring the wadded containers a pair at a time to a single feeding out line.

2. The method of wadding containers comprising the steps of providing an advancing single line of containers to be wadded, separating the line into pairs one pair at a time, moving the separate pairs of containers a pair at a time on the arc of a circle in step-by-step intermittent relation to a pair of stations having wadding devices which are unequally spaced in radial directions relative to the center, wadding one like container of each pair at one station and wadding the other container of each pair at a subsequent station, and moving the pairs of wadded containers from the arc into a feed-out line.

3. The method of wadding containers comprising the steps of advancing a single line of containers to be wadded, separating sets of a plurality of containers one set at a time from the head of the advancing line, traveling the sets separately along an arc having a center of curvature with each set arranged generally transversely to the line of advance of the sets along the arc, wadding like containers in each set one at a time at a location on the arc which is at a predetermined distance from said center, wadding other like containers in each set one at a time subsequently at a location on the arc which is at a different distance from the center and while the sets are still on the arc, and transferring the wadded sets to an out-feed line.

4. A machine for wadding containers comprising a base, a pair of devices for wadding containers on the base, a generally circular disc on the base, means to rotate the disc about its center in step-by-step relation to stop momentarily at a plurality of stations, generally radially arranged slots in the disc, said slots opening at the periphery of the disc, each slot being capable of receiving a pair of containers to be wadded in radially arranged condition, means to supply containers to the slots, a wadding element on each device arranged generally vertically at each of two different stations, said elements being placed at different radial distances from the center of the disc so that one wadding element coincides with one container of each pair and the other wadding element coincides with the other container of each pair for the wadding operation of the pairs of containers at different stations, and means to extract the wadded pairs of containers from the respective slots.

5. The machine of claim 4 including means to adjust the wadding devices on the base in a generally radial direction relative to the disc.

6. The machine of claim 4 including means to vertically adjust the base.

References Cited by the Examiner
UNITED STATES PATENTS

| | | | |
|---|---|---|---|
| 690,488 | 1/1902 | Valerius | 53—270 |
| 1,456,690 | 5/1923 | Goldberger | 53—277 |
| 1,708,313 | 4/1929 | Larsen | 53—278 |
| 2,540,120 | 2/1951 | Jacobs et al. | 53—279 X |
| 2,596,813 | 5/1952 | Gantzer | 53—115 |
| 3,030,748 | 4/1962 | Moses | 53—115 |

FRANK E. BAILEY, *Primary Examiner.*

TRAVIS S. McGEHEE, *Examiner.*